UNITED STATES PATENT OFFICE.

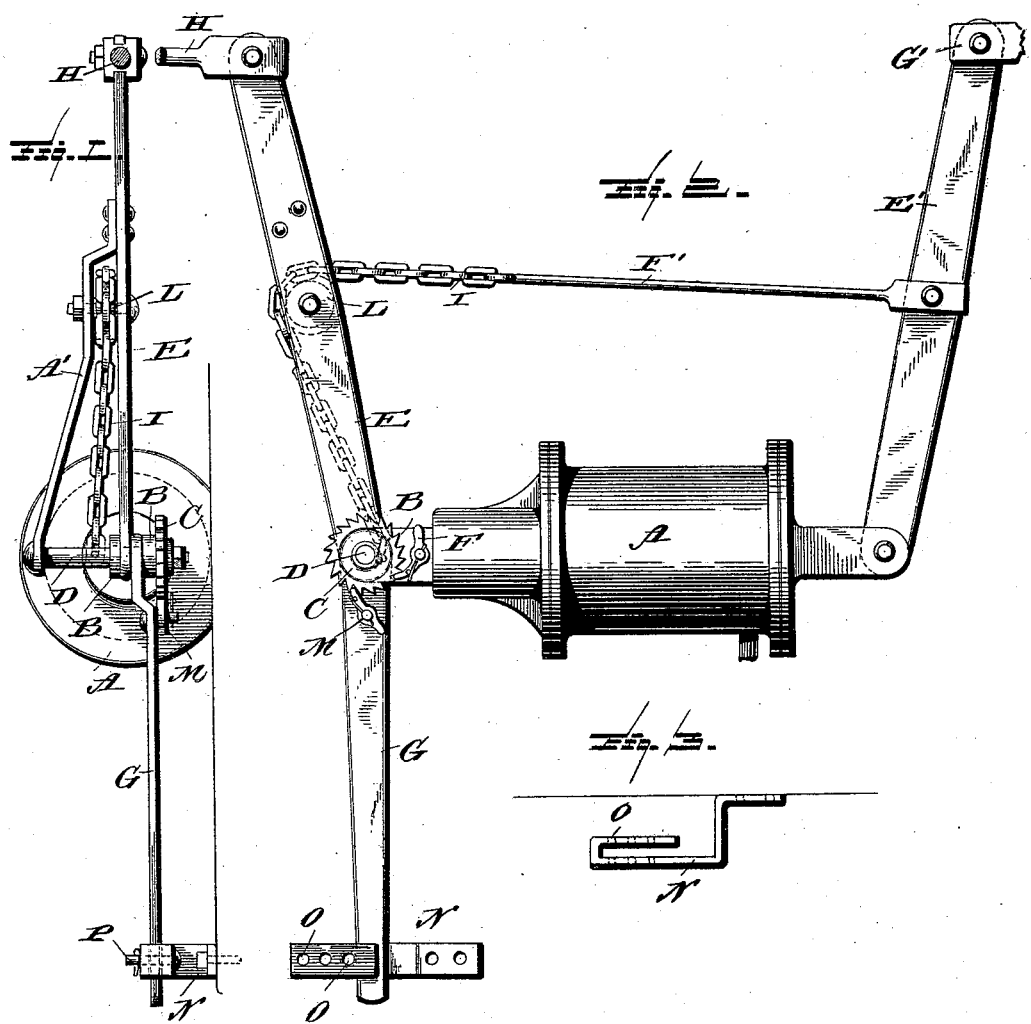

ALFRED P. RIGGS, OF COLORADO CITY, COLORADO.

SLACK TAKE-UP FOR AIR-BRAKES.

SPECIFICATION forming part of Letters Patent No. 457,215, dated August 4, 1891.

Application filed March 25, 1891. Serial No. 386,326. (No model.)

*To all whom it may concern:*

Be it known that I, ALFRED P. RIGGS, a citizen of the United States, residing at Colorado City, in the county of El Paso and State of Colorado, have invented certain new and useful Improvements in Attachments to Air-Brakes; and I do hereby declare that the following is a full, clear, and exact description of the same, reference being had to the annexed drawings, making a part of this specification, and to the letters of reference marked thereon.

This invention relates to certain new and useful improvements pertaining to air-brakes;
and it has for its object to provide simple and efficient mechanism for automatically taking up the slack in the connecting chain or cord. Provision is also made for the taking up of the entire slack or for allowing any amount of slack required for a safe manipulation of the brakes. I provide a ratchet-and-pawl mechanism actuated by the piston in the air-cylinder with suitable connections, whereby the desired end is accomplished. I arrange the adjusting-lever with a bracket at its outer end, so constructed that when the slack amounts to one inch one notch is taken up by the ratchet-wheel, and so keeps it taken up.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is an end view showing my invention. Fig. 2 is a plan thereof. Fig. 3 is a view of the adjusting-bracket detached.
Like letters of reference indicate like parts throughout the several views where they occur.

Referring now to the details of the drawings by letter, A designates an air-cylinder of usual construction and arranged to be affixed in position beneath a car in the usual manner. Within this cylinder works a piston (not shown) in the usual manner.

B is a cross-head connected with the piston, and on this cross-head is a ratchet-wheel C and a pawl F, arranged to engage with the teeth thereof. The pawl is spring-actuated, as shown in Fig. 2, to keep it to its work. The ratchet-wheel is carried by the shaft D, which passes through the cross-head and on which the adjacent ends of the levers E and G are secured, as seen in Fig. 1. The lever E is connected at the other end with one end of a rod or link H, which is designed to connect with the floating levers attached to the brake-beams. (Not shown.) This connection, however, is similar to that of all air-brake systems, and has therefore not been shown.

I is an adjusting-chain connected at one end to the shaft D, and, after passing over a sheave L on the lever E, is connected with the corresponding lever E', which is connected with the opposite end of the cylinder, as seen in Fig. 2. The chain may be connected directly to the lever E', or it may be connected therewith by means of the rod F', as shown. The lever E' is designed to be connected with the floating levers of the brake-beams (not shown) at the other end of the car by the rod G'. The outer end of the shaft D is supported and braced by the brace-arm A', which is attached at its other end to the lever E and forms a bearing for the shaft of the sheave-pulley, as seen in Fig. 1.

M is a spring-actuated pawl on the lever G and arranged to engage the ratchet-wheel, as seen in Figs. 1 and 2.

The operation is as follows: In applying the brakes the cross-head is pushed outward a certain distance, which sets the brake-shoes against the wheels. The setting occurs before the piston has reached its full stroke, and as the shoes wear away the piston moves out farther and farther. One end of the lever G is held in the bracket N against the pin in the hole O, and as the other end of the lever is carried forward by the cross-head when the piston moves outward the pawl M on the lever G rides upon a tooth in the ratchet back and forth as the piston moves in and out. Finally, when the shoes have worn away sufficiently, the pawl M will fall into another tooth on the ratchet, and when the piston moves back the shaft D will be turned to the extent of one tooth, and the chain will be wound upon the shaft D, thereby shortening the chain and taking up the slack.

N is a bracket attached to the bottom of the car and provided with a plurality of holes O, as seen best in Fig. 2, and between the arms of this bracket the outer end of the lever G works, as shown, and the movement of the lever G may be regulated, and the travel of the piston can be regulated by either lengthening or shortening the dead-point on the said lever, a bolt or pin P being placed in the desired hole, as seen in Fig. 1.

What I claim as new is—

1. The combination, with the air-cylinder and the automatic take-up actuated thereby, of the adjusting-bracket acting in conjunction with the adjusting-lever and embracing one end thereof, as set forth.

2. The combination, with the air-cylinder and the cross-head, of the lever G, the ratchet-wheel and pawl and shaft carried by the cross-head in line with the cylinder, the pawl on the lever G, and the adjusting-chain attached to the shaft of the ratchet-wheel and passed over a pulley on the lever, as set forth, 3. The combination, with the air-cylinder and the cross-head, of the ratchet-wheel on a shaft carried by the cross-head, the levers E and G, having their adjacent ends secured to said shaft, the pawl, the adjusting-lever and its pawl, and the adjusting-chain attached to the shaft of the ratchet-wheel, as and for the purposes specified.

In testimony that I claim the above I have hereunto subscribed my name in the presence of two witnesses.

ALFRED P. RIGGS.

Witnesses:
WILL P. EPPERSON,
E. A. BENEDICT.